(12) United States Patent  
Robinson et al.

(10) Patent No.: US 7,273,562 B2
(45) Date of Patent: Sep. 25, 2007

(54) OZONE INJECTION METHOD AND SYSTEM

(75) Inventors: Jack H. Robinson, Fairfax County, VA (US); Michael D. Jennings, Ellicott City, MD (US); Richard A. Mueller, Olmsted Falls, OH (US)

(73) Assignee: Nutech 03, Inc., Arlington, VA (US)

( * ) Notice: Subject to any disclaimer, the term of this patent is extended or adjusted under 35 U.S.C. 154(b) by 251 days.

(21) Appl. No.: 11/039,819

(22) Filed: Jan. 24, 2005

(65) Prior Publication Data

US 2005/0167369 A1 Aug. 4, 2005

Related U.S. Application Data

(63) Continuation-in-part of application No. 10/402,298, filed on Mar. 31, 2003, now Pat. No. 6,869,540.

(60) Provisional application No. 60/372,806, filed on Apr. 17, 2002.

(51) Int. Cl.
*C02F 1/78* (2006.01)
*B63B 39/03* (2006.01)

(52) U.S. Cl. ............... 210/760; 210/764; 210/192; 210/242.1; 210/931; 114/125

(58) Field of Classification Search ............. 210/760, 210/764, 192, 199, 205, 242.1, 931; 422/28, 422/186.07; 114/74 R, 125
See application file for complete search history.

(56) References Cited

U.S. PATENT DOCUMENTS

| | | | |
|---|---|---|---|
| 3,937,662 A | 2/1976 | Bartik | |
| 4,314,519 A * | 2/1982 | Yunoki et al. | 114/125 |
| 4,317,333 A | 3/1982 | Webby | |
| 4,364,516 A | 12/1982 | Rhoades et al. | |
| 4,619,763 A | 10/1986 | O'Brien | |
| 5,040,487 A * | 8/1991 | Bollyky et al. | 119/234 |
| 5,053,140 A * | 10/1991 | Hurst | 210/704 |
| 5,186,841 A * | 2/1993 | Schick | 210/760 |
| 5,218,988 A | 6/1993 | McNamara et al. | |
| 5,494,576 A | 2/1996 | Hoppe et al. | |
| 5,785,067 A | 7/1998 | Kosofsky | |

(Continued)

FOREIGN PATENT DOCUMENTS

WO       WO 00/20338       *   4/2000

OTHER PUBLICATIONS

High Efficiency In-Line Pressureized Ozone Contacting with the GDT™ Process, http://www.mazzei.net/articles_publications/papers/GDTPaper4.pdf . Berlin, Germany, Apr. 22, 1997.

(Continued)

*Primary Examiner*—Frank M. Lawrence
(74) *Attorney, Agent, or Firm*—Philip D. Freedman PC; Philip D. Freedman

(57) ABSTRACT

A target biokill of species for water to be discharged from a ballast tank of a sea faring vessel is determined. A diverted portion of sea water is regulated prior to charging the water into the ballast tank. Regulation of the diverted portion of water and a rate of injection of the ozone into the portion are adjusted to attain the target biokill. Then ozone at the determined rate into the regulated diverted portion to attain the target biokill when the portion is recombined into the water for charging to the ballast tank.

36 Claims, 5 Drawing Sheets

U.S. PATENT DOCUMENTS

| | | |
|---|---|---|
| 5,803,982 A | 9/1998 | Kosofsky et al. |
| 5,816,181 A | 10/1998 | Sherman, Jr. |
| 5,863,128 A | 1/1999 | Mazzei |
| 5,932,112 A | 8/1999 | Browning, Jr. |
| 6,000,418 A | 12/1999 | Kern et al. |
| 6,053,121 A | 4/2000 | Tamashima et al. |
| 6,106,731 A * | 8/2000 | Hayes ............... 210/760 |
| 6,125,778 A * | 10/2000 | Rodden ............ 114/74 R |
| 6,165,371 A | 12/2000 | Allen |
| 6,205,981 B1 | 3/2001 | Lorraine |
| 6,231,769 B1 * | 5/2001 | Pean et al. ............ 210/760 |
| 6,235,206 B1 * | 5/2001 | Chan et al. ............ 210/739 |
| 6,402,965 B1 * | 6/2002 | Sullivan et al. ........ 210/748 |
| 6,432,304 B1 | 8/2002 | Nguyen ................ 210/172 |
| 6,500,345 B2 | 12/2002 | Constantine et al. |
| 6,516,738 B2 * | 2/2003 | Cannon ................ 114/125 |
| 6,613,232 B2 * | 9/2003 | Chesner et al. ........ 210/650 |
| 6,840,983 B2 | 1/2005 | McNulty |
| 2002/0098759 A1 | 7/2002 | Blumenschain et al. |
| 2002/0162803 A1 | 11/2002 | Haney |
| 2002/0191683 A1 | 12/2002 | Ohtoski et al. |
| 2003/0015481 A1 * | 1/2003 | Eldem ................ 210/760 |
| 2004/0050798 A1 * | 3/2004 | Schulz et al. ........ 210/760 |
| 2004/0056966 A1 * | 3/2004 | Nguyen et al. ........ 210/746 |
| 2004/0060876 A1 * | 4/2004 | Tipton ................ 210/748 |
| 2004/0251215 A1 * | 12/2004 | Bai et al. ............ 210/748 |
| 2006/0027507 A1 * | 2/2006 | van Leeuwen et al. ..... 210/760 |
| 2006/0243673 A1 * | 11/2006 | van Leeuwen et al. ..... 210/760 |

OTHER PUBLICATIONS

Maceky, Tagg and Parsons, Technologies for Ballast Water Mangement, International Cooperation on Marine Engineering Systems, New York, May 22-23, 2000.

Oemcke, The Treatment of Ships' Ballast Water, EcoPorts Monograph Series No. 18, Section 9.5.5, Mar. 1999.

Oemcke and van Leeumwen, Potential of ozone for ballast water treatment, Ports Corporation Queensland, Section 1.1.3, Mar. 1998.

* cited by examiner

OZONE INJECTION METHOD AND SYSTEM

This application in a continuation-in-part application of copending U.S. application Ser. No. 10/402,298, filed Mar. 31, 2003, now U.S. Pat. No. 6,869,540, which claims the benefit of U.S. Provisional Application Ser. No. 60/372,806, filed Apr. 17, 2002, the disclosure of which are both incorporated herein by reference in their entirety.

This invention was made with government support under Contract No. NA04OAR awarded by the National Oceanic and Atmospheric Administration, Department of Commerce. The government has certain rights in the invention.

BACKGROUND OF THE INVENTION

The invention relates to a ballast water ozone injection method and system. More particularly, the invention relates to a system for using ozone to treat ballast water during loading or discharge of ballast water to or from the ballast tanks of a sea faring vessel.

Ballast water weight is used by sea vessels to compensate for a lack of cargo weight when the cargo load is empty or partially empty. For example in a typical transport operation, a sea vessel docks at a first port where it is loaded with a cargo that the vessel transports to a second port where the cargo is unloaded. The vessel then returns to the first port where it is loaded with another cargo. Typically, the vessel travels empty from the second port back to the first port to pick up another cargo. The vessel is equipped with ballast tanks that can be filled with water to maintain the balance of the vessel on an even keel when it travels empty. Conventional ballast tanks include valves usually mounted over apertures through tank bulkheads. The valves can be actuated to move water between and into and out of various ballast tanks to trim the vessel when empty of cargo or when carrying an unevenly distributed cargo.

The vessel fills its ballast tanks by taking on sea water, usually at its cargo discharge port. The sea water is charged into the ballast tanks at the same time that the vessel off loads its cargo. The vessel then travels to its cargo loading port where it takes on cargo while at the same time it empties at least some and typically all of its ballast tanks by discharging the ballast water into the loading port water environment.

The ballast water contains species that are indigenous to the cargo discharge port. Significant quantities of these species are loaded into the ballast tanks along with the water. The vessel then transports ballast water to the a cargo loading port where the species are discharged into the water environment along with discharged ballast water. The discharged species may be nonindigenous and deleterious to the discharge water environment. The nonindigenous species may cause damage to the water environment and replace benthic organisms and clear plankton communities that provide food and larvae for resident native species in overlying waters.

The zebra mussel (*Dreissena polymorpha*) is an example of an unwanted organism that has been spread by ballast water. The zebra mussel was first found in the mid eighteenth century in the northern Caspian Sea and in the Ural River. Since then, the mussel has spread to other parts of the world by means of ballast water discharge. The mussel was found in the Great Lakes in late 1988. It was first prevalent in Lake Erie. Since then, the mussel has spread into Lake Michigan and into rivers of the Midwest and Northeast.

The mussel has threadlike tentacles that enable it to adhere to any vertical or horizontal surface. It is particularly adherent to the shell of another mussel. It reproduces quickly and in a brief time can obtain population densities in excess of 30,000 mussels per square meter. Stacks of adhering mussels have been known to completely clog water intake orifices and shut down municipal water treatment plants and industrial water systems.

In 1996, Congress passed the National Invasive Species Act (P. L. 104-332) ("NAIS") to stem the spread of nonindigenous organisms by ballast water discharge. The act reauthorized the Great Lakes ballast management program and expanded applicability to vessels with ballast tanks. The Act requires the Secretary of Transportation to develop national guidelines to prevent the spread of organisms and their introduction into U.S. waters via ballast water of commercial vessels.

Guidelines developed pursuant to the Act can require vessels that enter U.S. water to undertake ballast exchange in the high seas. Ballast water exchange involves replacing coastal water with open-ocean water during a voyage. This process reduces the density of coastal organisms by replacing them with oceanic organisms with a lower probability of survival in near shore waters. However, ballast exchange has two important short-comings. First, the ability to safely conduct ballast water exchange depends upon weather and sea surface conditions, and it is not always possible to perform an exchange. Second, there is still some residual density of coastal organisms in ballast tanks following exchange, so the process is only partly effective.

Amendment of the National Aquatic Invasive Species Act (S 525 & HR 1080) would require that all ballast water discharged within the territorial waters of the United States (i.e. within 200 miles of the Coast or in the Great Lakes) be treated so as to kill or remove all aquatic nuisance species (i.e. bacteria, viruses, larvae, phytoplankton and zooplankton). The initial goal is to remove 95 percent, or more, of those species with the target to be ratcheted up as technology advances. (Nutech's technology meets this standard and, in many respects, already exceeds it. The legislative standard will increase as technology improves. The Coast Guard is now working on its own treatment standard.)

The NAIS bill mandates that ships built after Jan. 1, 2006 must have such technology on board. Depending on how the bill is amended by Congress, ships already in service may be allowed to continue exchanging ballast water, if it is done outside the 200 mile limit or that escape clause may be removed at some point.

In February 2004, the International Maritime Organization (IMO-U.N.) approved a treaty that mandates the same thing. The two differences are that the IMO Treaty will not take effect before 2009 and, in some cases, before 2016, and there are different treatment requirements as to how many invasive species would be permitted in treated water and as to when the regulations will apply to different sized ships.

It is anticipated that Congress will opt for the more stringent NAIS standards rather than the laxer UN/IMO standards, but this is not certain. It is also possible that Congress could take key IMO Treaty provisions and insert them into the NAIS bill but this appears unlikely based on comments made during the House Transportation Committee hearing on the NAIS bill.

Sea water loaded into ballast tanks to stabilize sea faring vessels is a complex composition of physical, chemical and biological entities. Additionally, the composition of the sea water varies considerably from world port to port, particularly in terms of biological constituents. The complexity and variation of the sea water makes treatment unpredictable. Various known methods and systems for treating water may not work for treating ballast water because of a resistant bio entity or unexpected chemical constituency.

There is a need for a safe and effective method and system to treat ballast water for discharge into destination water environments. More particularly, there is a need for a system and method that addresses various standards for ballast water discharge. Also, there is a need for a system and method that can be applied to the complex and various sea water compositions that are loaded from different ports in the world.

BRIEF DESCRIPTION OF THE INVENTION

A first aspect of the invention is a method of ozone treatment, comprising determining a target biokill of species for water charging into a ballast tank of a sea faring vessel; regulating a diverted portion of the water prior to charging the water into the ballast tank; adjusting the regulating of the diverted portion of water and a rate of injection of ozone into the portion to attain the target biokill; and injecting ozone at the determined rate into the regulated diverted portion to attain the target biokill when the portion is recombined into the water for charging to the ballast tank.

In an embodiment, the invention is a method of ozone treatment comprising diverting a portion of water charging into a ballast tank of a sea faring vessel; determining an ozone generating capacity Q sufficient to inject ozone into the portion to attain a target ozone concentration when the portion is recombined into the water for charging into the ballast tank; injecting ozone into the portion by a generator having the determined ozone generating capacity; and recombining the portion with the water for charging into the ballast tank.

In another embodiment, a method of ozone treatment comprises determining a target biokill of species for water charging into a ballast tank of a sea faring vessel; diverting a portion of the water prior to charging into the ballast tank; determining an ozone generating capacity sufficient to inject ozone into the portion to attain a target ozone concentration when the portion is recombined into the water for charging into the ballast tank; regulating the diverted portion and adjusting a rate of injection of ozone into the portion with a generator having the determine ozone generating capacity to attain the target biokill when the portion is recombined into the water for charging to the ballast tank; and recombining the portion with the water for charging into the ballast tank.

A ballast-water treatment system comprises a sea faring vessel including at least one ballast tank and at least one conduit conveying water to or from an intake/outlet to the ballast tank; a regulator to divert a portion of the water from the conduit; an injector to provide an ozone injection rate into the portion of water; and a controller operatively connected to the regulator and the injector to adjust the diverted portion of water and injection rate of the ozone into the portion to attain the target biokill when the portion is recombined with the water.

In another embodiment, a method of ozone treatment comprises determining a target biokill of species for ballast water unloading from a sea faring vessel to the sea; regulating a diverted portion of the ballast water prior to unloading; adjusting the regulating of the diverted portion of water and a rate of injection of ozone into the portion to attain the target biokill; and injecting ozone at the determined rate into the regulated diverted portion to attain the target biokill when the portion is recombined into the water for unloading the ozone injected water to the sea.

In still another embodiment, a ballast-water treatment system comprises a sea faring vessel including at least one ballast tank; an ozone generator that generates ozone, a ballast water conduit that discharges water from the ballast tank and conducts the water to an unloading port of the sea faring vessel; a regulator to divert a portion of the water from the conduit; an injector to provide an ozone injection rate into the portion of water; and a controller operatively connected to the regulator and the injector to adjust the diverted portion of water and injection rate of the ozone into the portion to attain the target biokill when the portion is recombined with the water in the conduit.

Further in another embodiment, a method of ozone treatment comprises uploading sea water to a ballast tank of a sea faring vessel; regulating a diverted portion of the uploading water prior to charging the water into the ballast tank; adjusting the regulating of the diverted portion of water and a rate of injection of ozone into the portion to attain a target biokill; and injecting ozone at the determined rate into the regulated diverted portion to attain the target biokill when the portion is recombined into the uploading water for charging to the ballast tank.

DETAILED DESCRIPTION OF THE INVENTION

Figure 1:
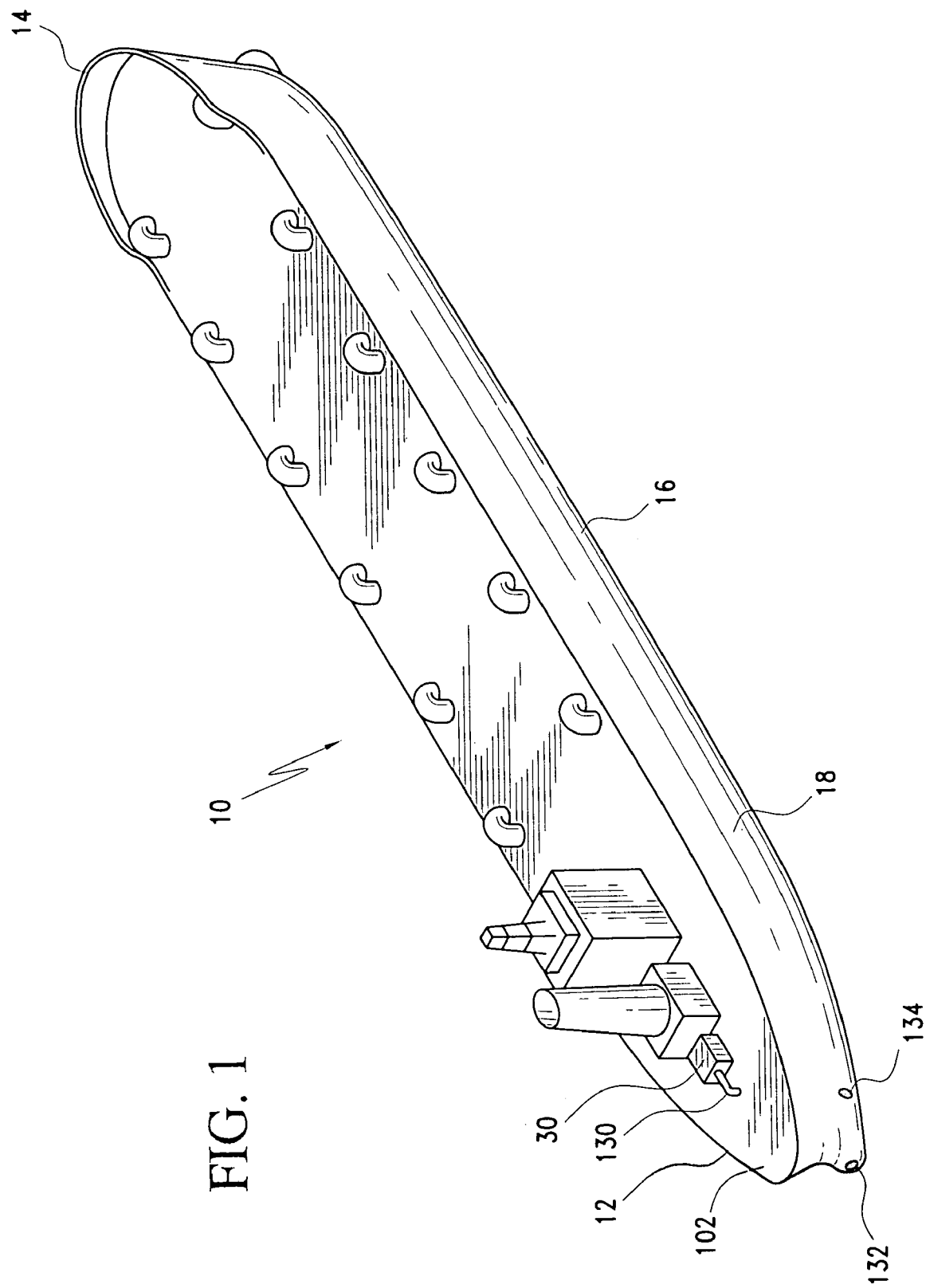
FIG. 1 is a schematic perspective view of a double hulled vessel and treatment system.

The invention provides a safe, environmentally consistent and effective method and system to treat ballast water. Currently, the proposed NAIS defines "ballast water" as "any water (with its suspended matter) used to maintain the trim and stability of a vessel." The NAIS definition of "ballast water" is incorporated into this specification as an embodiment of treatable ballast water.

Ozone ($O_3$) is an allotropic form of oxygen. It is an unstable blue gas with a pungent odor, a molecular weight of 48 g/mol and a density as a gas of 2.154 g/liter at 0° and 1 atm. It is approximately 13 times more soluble in water than is oxygen. Ozone is highly unstable and is a powerful oxidizing agent. It is 1.5 times better and approximately 3125 times faster than chlorine as an oxidizer. It is non-persistent and has a very short half-life. Its half-life in pure distilled water is approximately 40 min at pH 7.6. Because of the unstable nature of the $O_3$ molecule, it cannot be stored but must be generated on-site.

Typically, ozone is produced by passing oxygen, in some concentration, through a highly charged corona field, a technique known as "corona discharge". The corona may be produced by applying a very high electric potential (20 kV) between two conductors that are separated by an insulating dielectric layer and a small air gap. Under these conditions, molecular oxygen ($O_2$) passing through the gap between the conductors experiences sufficient dissociation energy to partially ionize. A certain fraction of the free oxygen ions will re-associate in the form of $O_3$, according to the equilibrium reaction equation:

$$3O_2 + 69 \text{ kcal} \leftrightarrows 2O_3 \qquad (I)$$

Ozone is currently used as a means for purifying liquids, but most applications for this technology have centered on relatively low liquid volume applications. But ozone is increasingly suggested as a candidate for very large scale liquid purification projects. For example, ozone has been used to treat ballast water in ballast water tanks. The ozone rapidly converts naturally occurring ballast water iodides and bromides into bromine and iodine, which can be toxic to organisms. The general concept of ballast water treatment with ozone is to use a sea faring vessel's transit time between ports as an opportunity for treatment. In-transit ozone treatment of ballast water has been found to be cost-effective and environmentally sound. Ozone treatment is viewed as superior to both chemical treatment, which may require the transportation and disposal of hazardous substances over the sea, and separation technology, which is uneconomical because of the large volume of water requiring treatment.

The generation of ozone as represented by equation (I), is an equilibrium reaction. The reaction is endothermic to produce $O_3$, requiring energy, and is exothermic to produce $O_2$, giving up energy. Because of its equilibrium nature, the actual efficiency of this ozone formation is relatively low, in the range of 2-8%, depending on the oxygen content of the feed gas and the temperature of the reaction. After ozone generation, the feed gas is a dilute mixture of ozone. This dilute mixture is then diffused through a treatment liquid such as ballast water. However, the high-energy state of ozone results in very low stability of the gas. The natural tendency is for the ozone to revert back to the more stable, lower-energy allotrope $O_2$. The ozone has a very short half-life, about 40 minutes in distilled water at a pH of 7.6. Consequently, the storage of ozone is impractical and ozone generation must be performed substantially at the location of use.

In accordance with an invention embodiment, ballast water that is loaded through a port of a sea faring vessel is injected with ozone prior to charging of the water to a ballast tank. The invention can utilize a single point or a small number of ozone injection points to eliminate many of the disadvantages of the prior art ballast tank diffuser method. In another embodiment, ballast water that is discharged from a ballast tank is treated by injection of ozone into the unloading ballast water conduit prior to unloading to the sea. Surprisingly, despite the short half-life of ozone and the difficulty of charging a flow of water, injection of ozone to loading or discharging ballast water provides a residence time and diffusion for satisfactory biokill. In an embodiment of the invention, a rate of injection of the ozone into the water is adjusted and the rate of water loading into (or unloading from) the vessel is adjusted to provide a target biokill of species within the water. In this method, a target biokill can be determined, for example by consulting ballast water discharge regulations, and a rate of ozone injection into the water and/or the rate of water flow in the water conduit can be adjusted to obtain the target biokill. For example, the rate of injection can be adjusted and/or the rate of water loading can be adjusted to provide a concentration of ozone of 1.0 to 4.5 mg/l, desirably 1.5 to 4.0 mg/l and preferably 2.0 to 3.0 mg/l. This concentration can be effective to obtain in excess of 95% biokill of all species proscribed by the National Invasive Species Act.

Commonly assigned Robinson et al., parent application Ser. No. 10/402,298, now U.S. Pat. No. 6,869,540 teaches an injection method and system for the ozone treatment of ballast water. In Robinson et al., a method of ozone treatment comprises injecting ozone into water loading into a sea faring vessel prior to charging the water into a ballast tank; charging the ozone injected water into the ballast tank; and adjusting a rate of injection of the ozone into the water and adjusting the rate of water loading into the vessel to provide a target biokill of species within the water. Also, a ballast-water treatment system comprises a sea faring vessel including at least one ballast tank; an ozone generator that generates ozone, a ballast water conduit that uptakes water through a loading port of a sea faring vessel and conducts the water to load the ballast tank; an ozone feed line that injects ozone from the generator into water in the conduit at an injection point located upstream to an intersection of the conduit with the ballast tank; a controller operatively connected to the conduit to regulate water flow within the condiut; a controller operatively connected to the ozone generator to regulate injection of ozone into the water flowing within the conduit; and a computer usable medium comprising a set of instructions to operate the water flow controller to regulate water flow within the conduit and operatively connected to the ozone generator controller to regulate injection of ozone into the water flowing within the conduit.

Eidem U.S. DN 20030015481 discloses serially connected small ozone generators sized to provide an initial ozone concentration in ballast water of up to 5 mg/l, preferably in the range of 1 to 4 mg/l, more preferably in the range of 1.5 to 3.5 mg/l, and most preferably in the range of 2 to 3 mg/l, measured as total residual oxidant (TRO).

However according to the present invention, a correctly sized single generator can be selected to adequately treat sea water for discharge from ballast tanks of sea faring vessels. Not only that but a correctly sized single generator can be selected that adequately treats a plurality of separate ballast water uptake/discharge conduits to a plurality of ballast tanks.

The present invention is based on consideration of the physical and chemical nature of ozone in ballast water including the solubility of ozone in sea water and the relationship of the chemical reactions of the ozone to solubility. These reactions and reaction rate constants or equilibrium constants where known are as follows:

$$O_3 + Br^- \rightarrow O_2 + OBr^- \quad k=160 \pm 20 \ M^{-1}s^{-1} \qquad (II)$$

$$O_3 + OBr^- \rightarrow 2O_2 + Br^- \quad k=330 \pm 60 \ M^{-1}s^{-1} \qquad (III)$$

$$OBr^- + HO^+ \rightarrow HOBr + H_2O \quad k=2.06 \times 10^9 M^{-1}s^{-1} \qquad (IV)$$

$$HOBr + H_2O \rightarrow OBr^- + H_2O \quad pK_a = 8.8-9.0 \qquad (V)$$

$$2O_3 + OBr^- \rightarrow 2O_2 + BrO_3^- \quad k=100 \pm 20 \ M^{-1}s^{-1} \qquad (VI)$$

$$HOBr + NH_3 \rightarrow NH_2Br + H_2O \quad k=7.5 \times 10^7 M^{-1}s^{-1} \qquad (VII)$$

From consideration of the physics and chemistry of ozonation of seawater and from TRO (a measure of biokill) studies, applicants have found a method to provide an ozone concentration in water loading into a ballast tank that attains a targeted biokill in the water. Additionally, the invention provides a method and system that permits selection of a reasonably sized ozone generator to provide an ozone concentration that will result in the target ballast water biokill. In the invention, adequate ozone treatment with a correctly selected single generator rather than a series of smaller generators provide the target biokill to meet a discharge requirement, for example to meet an NAIS or like legislation requirement.

Features of the invention will become apparent from the drawings and following detailed discussion, which by way of example without limitation describe preferred embodiments of the invention.

Figure 2:
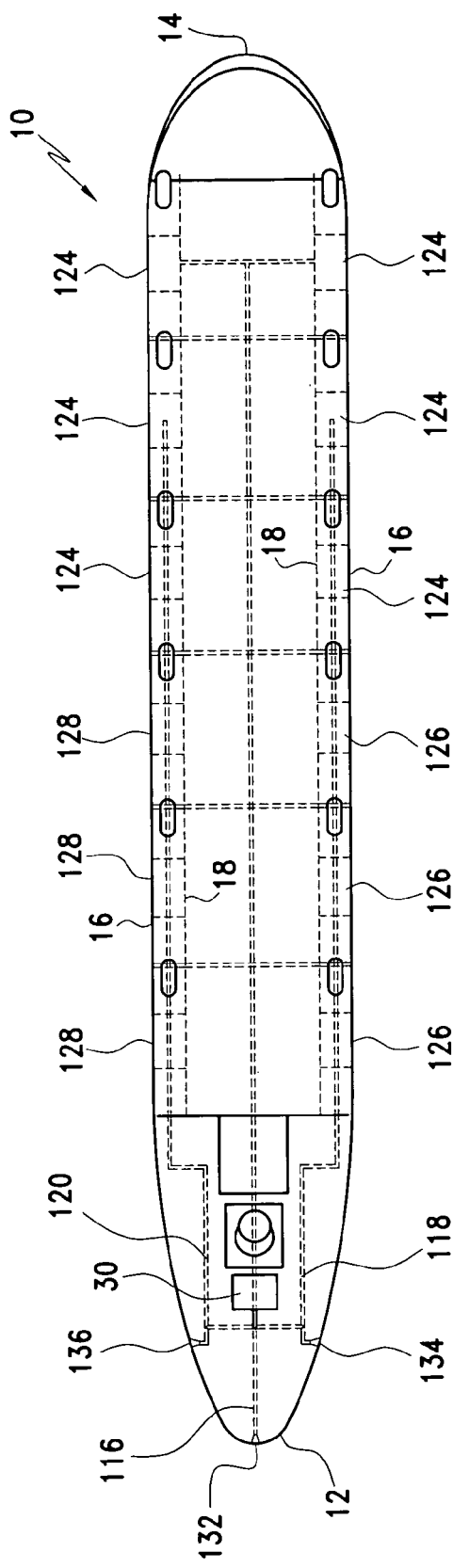
FIG. 2 is a schematic side view of the vessel and treatment system.
Figure 3:
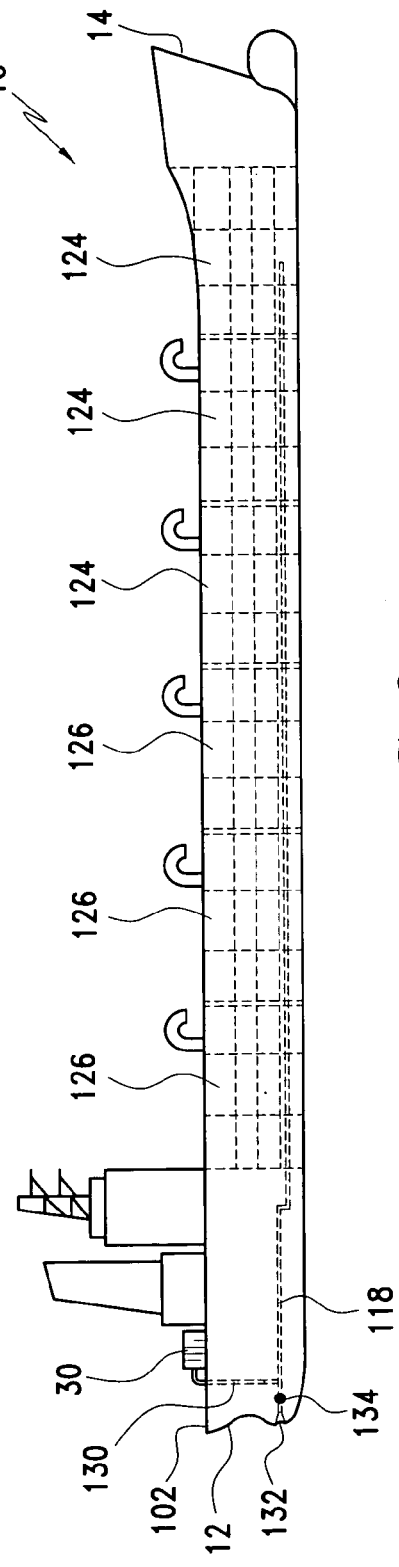
FIG. 3 is a schematic top view of the vessel and treatment system.

FIGS. 1 to 3 schematically show vessel 10 including stern 12, bow 14 and a double hull formed from outer hull 16 and inner hull 18. Vessel 10 is representative of the types of vessels encompassed within the invention and is a conventionally proportioned double hulled oil tanker having cargo compartments within inner hull 18. However, the present invention can be applied to any sea faring ship or vessel that has ballast tanks or bilge water. The vessel 10 is typical of vessels that transport partly or fully refined or residual petroleum or other bulk liquid products such as seed oil.

Ozone generator 30 is illustrated located on vessel 10 aft deck 102 with main ozone feed line 130 shown as part of the ozone injection system of the invention. Generator 30 can be structured and can generate ozone as described by Rodden U.S. Pat. Nos. 6,125,778; 6,139,809; and 6,270,733, Tabata U.S. DN 20040223893; Eidem U.S. DN 20030015481; Lee et al. U.S. Pat. No. 6,730,277; Borgstrom U.S. Pat. No. 6,726,885; Golota et al. U.S. Pat. No. 6,544,486; Conrad U.S. Pat. No. 6,491,879; Cannon U.S. Pat. No. 6,516,738; Smith U.S. Pat. No. 6,468,400; and Pean et al. U.S. Pat. No. 6,231,769 as examples. The disclosures of these patents are incorporated herein by reference in their entirety.

Ozone is pumped from generator 30 through line 130 for injection into water in respective ballast water intake/discharge conduits 116, 118 and 120 via respective connector lines 110, 112 and 114 in accordance with the FIGS. 1 through 3 and 4A and 4B embodiment of the invention. Intake/discharge conduit 116 conveys water from stern intake/outlet sea chest 132 to forward battery 124 of ballast tanks. Intake/discharge conduit 118 conveys water from starboard intake/outlet sea chest 134 to a starboard battery 126 of ballast tanks. And intake/discharge conduit 120 conveys water from port intake/outlet sea chest 136 to a port battery 128 of ballast tanks.

Ballast water is loaded into the vessel 10 via the sea chests 132, 134, 136 and is then pumped to load respective ballast tank batteries 124, 126, 128 through the system of conduits 116, 118 and 120 shown. At a destination location, the process is reversed and water is pumped from tank batteries 124, 126, 128 through the respective conduits 116, 118, 120 for discharge through respective sea chests 132, 134, 136 to the sea. Or, discharge can be effected through another, separate conduit and sea chest system (not shown) from tank batteries 124, 126, 128. After injection with ozone, the water is conveyed by one of the main conduits 116, 118, 120 to respective tank batteries 124, 126, 128. As each main conduit 116, 118, 120 passes through each ballast tank 124, 126 or 128, a smaller footer pipe (not shown) can be taken off to provide a suction/discharge conduit. Valving for the footer pipe can be contained in a tunnel or cofferdam area, or actually placed in the tank itself, if space is an issue.

Figure 4A:
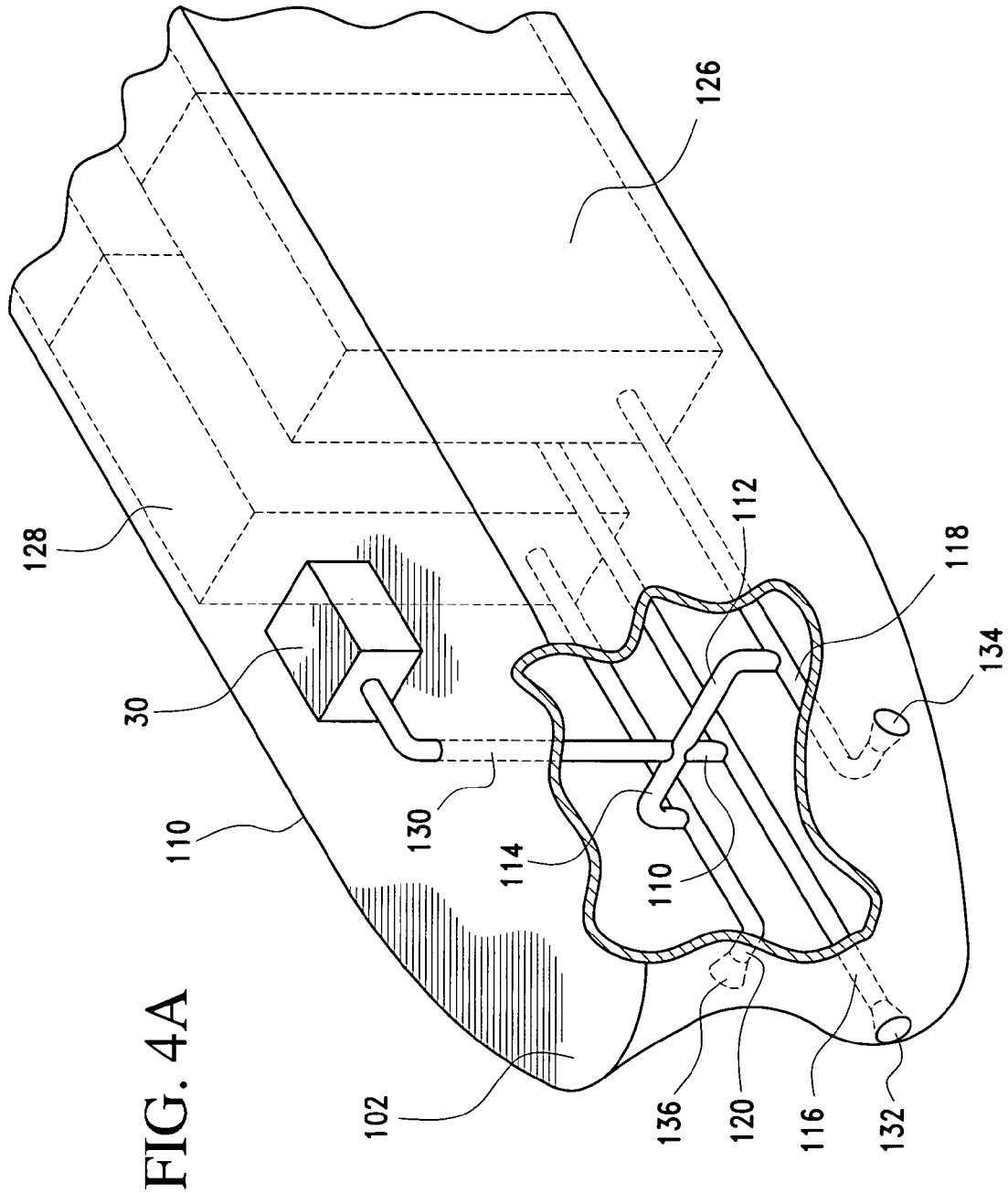
FIGS. 4A and 4B are a schematic representations of an embodiments of a ballast water ozone injection method and system.
Figure 4B:
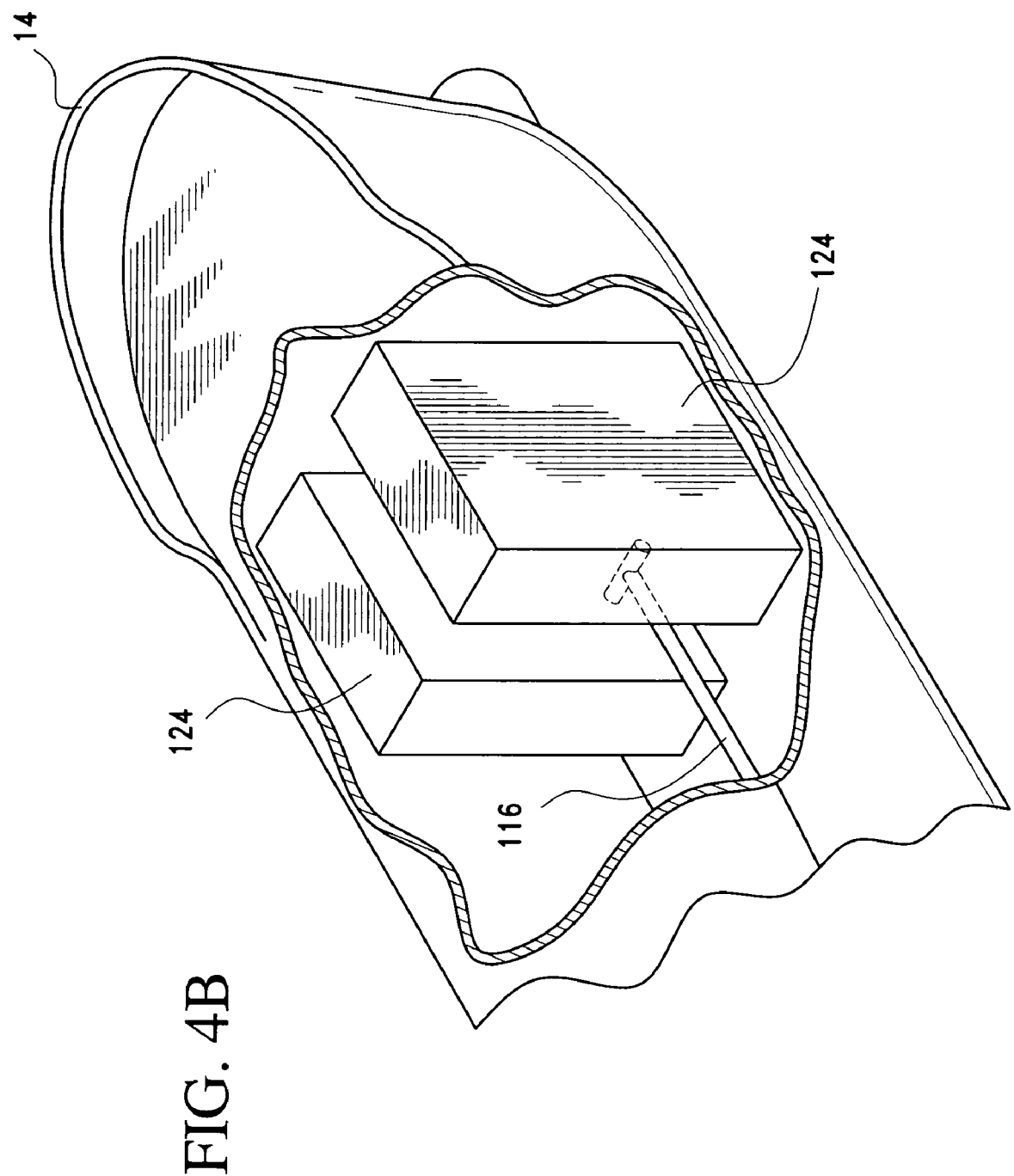

In FIG. 4A, conduit 118 delivers ozone treated water to each ballast tank of a starboard battery of tanks 126 and conduit 120 delivers ozone treated water to each ballast tank of a port battery of tanks 128. Water enters through respective sea chests 134 and 136 and is treated and charged into a tank of either the starboard battery 126 or the port battery 128 until each respective tank is sufficiently filled and balanced to compensate for off-loaded cargo. Similarly, as shown in FIGS. 4A and 4B, water enters through stem sea chest 132, is treated with ozone delivered via line 110 and charged into a tank of forward battery 124 until each tank is filed to balanced the vessel 10.

Figure 5:
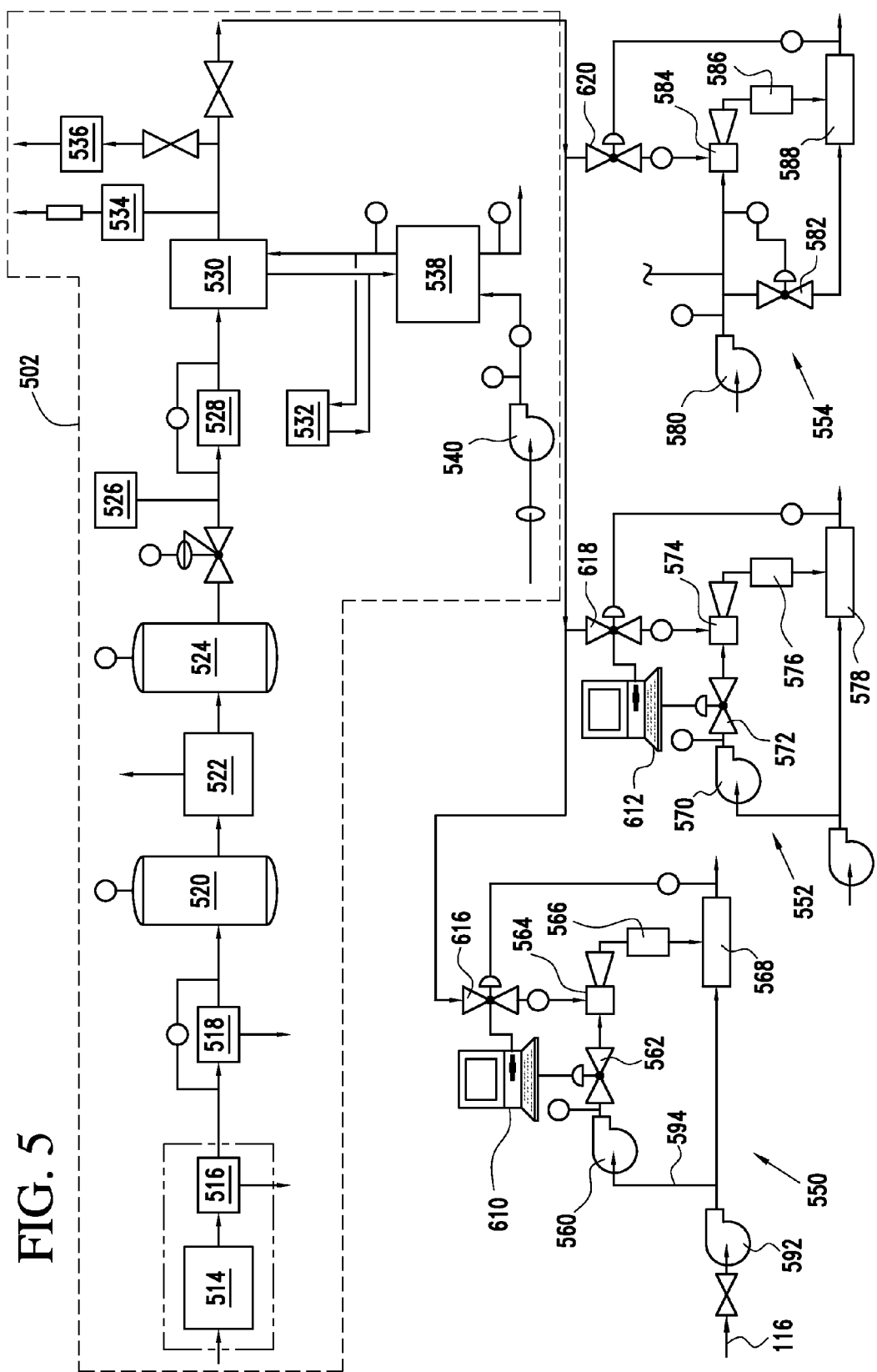
FIG. 5 is a flow diagram of a method and system for ballast water ozone injection.

FIG. 5 is a flow diagram of an embodiment of a method and system for ballast water ozone injection that can be used in conjunction with the system of vessel 10 shown in FIGS. 1 to 3 and 4A and 4B. In FIG. 5, ozone generation system 502 includes air compressor 514, refrigerated air dryer 516, coalescing filter 518, air receiver 520, $O_2$ enricher 522, $O_2$ receiver 524, dew point monitor 526, filter 528, ozone generator 530, power supply 532, ozone monitor 534, ozone destruct unit 536 and chiller 538 with circulation pump 540. In operation, air is drawn into the system 502 via air intake (not shown). The air is compressed 514, dried and refrigerated 516, filtered 518 and temporarily stored 520. Then according to generator demand, air is withdrawn to enricher 524, where oxygen content of the gas is differentially increase to nitrogen. Oxygen enriched gas is delivered to receiver 524 monitored 526 and filtered 528 until injected into ozone generator 530 operated via power supply 532. Off gas from generator 530 is monitored 534 and destroyed 536 to prevent environment discharge. Generated ozone is stored at chiller 538 until demanded by injection systems 550, 552, 554 as hereinafter described.

FIG. 5 shows three separate injection systems 550, 552, 554, which can correspond respectively to injection into aft intake conduit 116 via 110, injection into starboard intake conduit 118 via 112 and injection into port intake conduit 120 via 114 as shown in FIG. 4A. Injection system 550 includes ozone injector pump 560, flow regulator 562, ozone injector 564, predisperser 566 and mainline contactor 568. Similarly injection system 552 includes ozone injector pump 570, flow regulator 572, ozone injector 574, predisperser 576 and mainline contactor 578 and injection system 554 includes ozone injector pump 580, flow regulator 582, ozone injector 584, predisperser 586 and mainline contactor 588. Injection systems 550 and 552 are controlled respectively by controllers 610 and 612. Controller 610 or 612 can be a processor, computer or microprocessor or the like for controller injected ozone as hereinafter described.

Taking system 550 as an exemplary system, operation is described as follows: Sea water from sea chest 132 is fed in conduit 116 via main ballast water pump 592 to injection system 550. A portion of the sea water is diverted by circulation pump 560 from conduit 116 into by-pass line 594. Flow of the diverted water portion is controlled by flow regulator 562. Injector 564 injects ozone from generator 530 into the diverted sea water portion. The ozone injector 564 can be a venturi injector or the like. The injected ozone is dispersed further into the sea water portion by predisperser 566 and combined back with the main sea water in conduit 116 at mainline contactor 588.

In each of the aft conduit injector system 550 and starboard conduit injector system 552, each of flow regulators 562 and 572 and each valve 616 and 618 to each respective ozone injector 564 and 574 are controlled by respective controller 610 and 612. The controller 610 or 612 can be a computer or microproscessor or the like.

A target biokill of species for ballast water discharged from a sea faring vessel can be established, in a typical case by reference to a discharge jurisdiction requirement, for example by reference to the NAIS or like legislation. An ozone concentration in the water to attain the target biokill is then determined empirically and according to physical and chemical factors relating to the ozone. The controller can include a set of instructions to adjust the regulating of the diverted portion of water and rate of injection of the ozone into the portion to attain the target biokill. The diverted portion can be regulated and the rate of ozone injection can be adjusted according to a set of instructions resident in the computer memory to provide the target biokill at a lowest threshold ozone concentration in the recombined water.

In operation for example, controller 610 controls flow regulator 562 to regulate water flow in coordination with ozone injection by injector 562 to effectively achieve biokill prior to water loading into ballast tanks 124 to effectively achieve biokill prior to discharging ballast water from ballast tanks 124 to the sea. For example, the system can be controlled to attain a target 95% biokill of species that are proscribed by the National Invasive Species Act. Thus the controller 610 can coordinate flow regulator 562 with injector 564 to provide a concentration of 2.5 mg/l of ozone in the sea water to effectively provide a target biokill.

EXAMPLE 1

The FIG. 5, ozone generator 530 can be selected according to the following. First, a target species biokill is established. In this example, a 99% biokill is targeted; meaning that the treatment target of the process is to kill 99% of the species contained in the sea water intake loaded into the ballast tanks. Expressed in another manner, a target biokill may result in a sea water having 1 microbe per cubic meter of treated water or less. Empirical TRO testing of a subject sea water loading establishes that an ozone concentration of between 1.0 mg/liter and 3.0 mg/liter of seawater is required to obtain the 99% target biokill. $Q_T$ is a summation of the capacities of the vessel 10 ballast water intake pumps at all sea chests ($\tau$) according to formula (I):

$$Q_\tau = Q_1 + Q_2 + \ldots Q_n \quad (I)$$

where $Q_\tau$ is a capacity total of the respective pump capacities of n number of intake pumps. In this EXAMPLE, n is three in respect of stern intake pump at stem sea chest 132; starboard intake pump at starboard sea chest 134 and port intake pump at port sea chest 136. In this EXAMPLE, the respective pump out capacities are 17,000 gallons per minute (gpm), 500 gpm and 2,000 gpm and $Q_\tau$ equals 19,600 gpm. Converted to An ozone production rate capacity $Q_r$ to attain an upper target ozone treatment rate of 3.0 mg/liter ($T_R$) for a required 99% biokill is:

$$Q_r = Q_\tau T_R C_1 C_2 C_3 \quad (1)$$

where $C_1$ is a pounds to kilogram conversion constant; $C_2$ is a gallons to liters conversion constant and $C_3$ is a minutes to daily conversion constant.

The conversion constants convert the ozone production rate capacity to an Imperial unit of measure for comparison to standard rating capacities of pump manufacturers and suppliers. In formula (II) above $Q_r$ is $Q_\tau T_R$ (2.206 lbs/kg/10⁶ mg/Kg) (3.79 liters/gallon) (60×24) and $Q_r$ equals 707.60 ozone pounds per day. Available ozone generators are compared to the $Q_r$ 707.60 ozone pounds per day requirement to select a generator 530 to attain the required biokill.

A corresponding injector 564 can be selected according to the following: The capacity of the selected generator is converted to a standard cubic feet per minute (SCFM) gas injection. This value is Qa is the generator capacity of 707.60 pounds per day converted to SCFM considering that the selected generator generates a 12% ozone-containing gas. In this EXAMPLE, the SCFM is 56.

Then each injector is sized according to the following representative required output proportionation:

$$Q_{a1} = (Q_1/Q_r)Qa \quad (2)$$

For example for a first injector, the required capacity $Q_{a1}$ is (17,000/19,6000)×56 equal to 48.7 SCFM. Available injectors are compared to the respective $Q_{a1}$, $Q_{a2}$ and $Q_{a3}$ requirements to select respective injectors to attain the required biokill.

The procedure of this EXAMPLE provides a precise generator sizing and gas flow for each injector to attain a target biokill.

The invention advantageously minimizes system hardware particularly piping and control cabling. The invention replaces valves and controls from ballast tank water to extend system life and simplify maintenance and repair compared to an in-tank ballast water treatment system.

While preferred embodiments of the invention have been described, the present invention is capable of variation and modification and therefore should not be limited to the precise details of the Examples. The invention includes changes and alterations that fall within the purview of the following claims.

What is claimed is:

1. A method of ozone treatment, comprising:
   determining a target biokill of species within water charging into a ballast tank of a sea faring vessel;
   regulating a diverted portion of the water prior to charging the water into the ballast tank;
   adjusting the regulating of the diverted portion of water and a rate of injection of ozone into the portion to attain the target biokill; and
   injecting ozone at the determined rate into the regulated diverted portion to attain the target biokill when the portion is recombined into the water for charging to the ballast tank.

2. The method of claim 1, additionally comprising charging the ozone injected water into the ballast tank.

3. The method of claim 1, additionally comprising charging the ozone injected water into a plurality of ballast tanks.

4. The method of claim 1, wherein the target biokill is one microbe per cubic meter of water or less.

5. The method of claim 1, comprising adjusting the regulating of the diverted portion of water and a rate of injection of the ozone into the portion of water to provide a concentration of ozone of 1.0 to 4.5 mg/l in the water charging into the ballast tank.

6. The method of claim 1, comprising adjusting the regulating of the diverted portion of water and a rate of injection of the ozone into the portion of water to provide a concentration of ozone of 1.5 to 4.0 mg/l in the water charging into the ballast tank.

7. The method of claim 1, comprising adjusting the regulating of the diverted portion of water and a rate of injection of the ozone into the portion of water to provide a concentration of ozone of 2.0 to 3.0 mg/l in the water charging into the ballast tank.

8. The method of claim 1, comprising injecting ozone into the diverted portion at a single point prior to charging the water into the ballast tank.

9. The method of claim 1, comprising injecting ozone into a diverted portion of each of a plurality of water streams prior to charging each stream into a respective ballast tank of a plurality of ballast tanks.

10. The method of claim 1, comprising regulating the diverted portion of water prior to injecting ozone into the portion and dispersing the injected ozone in the portion prior to recombining the portion into the water for charging into the ballast tank.

11. A method of ozone treatment, comprising:
diverting portions of water charging into a plurality of ballast tanks of a sea faring vessel;
determining an ozone generating capacity Q sufficient to inject ozone into the portions to attain a target ozone concentration when the portions are recombined into water for charging into the plurality of ballast tanks;
injecting ozone into the portions by at least one generator having the determined ozone generating capacity; and
recombining the portions with water for charging into the ballast tanks.

12. The method of claim 11, comprising determining the target ozone concentration according to a target biokill of species for the water charging into the plurality of ballast tanks.

13. The method of claim 11, comprising regulating the diverted portions of water prior to injecting ozone into the portions and dispersing the injected ozone in the portions prior to recombining the portions into the water for charging into the plurality of ballast tanks.

14. The method of claim 11, additionally comprising:
determining an ozone generating capacity to provide the concentration of ozone sufficient to provide a target biokill in the water charging into plurality of ballast tanks;
converting the capacity to a generator rating value; and
selecting at least one generator according to the rating value to inject ozone into the portion.

15. The method of claim 11, additionally comprising:
determining an ozone generating capacity according to a treatment rate T to provide the concentration of ozone required to treat the ballast water to provide a target biokill in the water charging into the ballast tank;
converting the capacity to a generator rating value; and
selecting the generator according to the rating value to inject ozone into the portion.

16. The method of claim 11, additionally comprising:
determining a treatment rate T required to treat the ballast water to provide a target biokill;
determining the ozone generator capacity Q according to the treatment rate T;
selecting the ozone generator according to the determined capacity Q; and
injecting ozone into the portion by the generator.

17. The method of claim 16, comprising determining a treatment rate T required to treat the ballast water to provide the target biokill; and
determining an ozone generator capacity $Q_n$ according to a summation of a capacity according to a treatment rate T required to treat ballast water of conduits to a plurality of ballast tanks.

18. A method of ozone treatment, comprising:
determining a target biokill of species within water charging into a ballast tank of a sea faring vessel;
diverting a portion of the water prior to charging into the ballast tank;
determining an ozone generating capacity sufficient to inject ozone into the portion to attain a target ozone concentration when the portion is recombined into the water for charging into the ballast tank;
regulating the diverted portion and adjusting a rate of injection of ozone into the portion with a generator having the determine ozone generating capacity to attain the target biokill when the portion is recombined into the water for charging to the ballast tank; and
recombining the portion with the water for charging into the ballast tank.

19. The method of claim 18, wherein the diverted portion is regulated and the rate of ozone injection is adjusted according to a set of instructions to provide the target biokill at a lowest threshold ozone concentration in the recombined water.

20. The method of claim 18, wherein the diverted portion is regulated and the rate of ozone injection is adjusted according to a set of instructions resident in a computer memory to provide the target biokill at a lowest threshold ozone concentration in the recombined water.

21. A ballast-water treatment system comprising:
a sea faring vessel including at least one ballast tank and at least one conduit conveying water to or from an intake/outlet to the ballast tank;
a regulator to divert a portion of the water from the conduit;
an injector to provide an ozone injection rate into the portion of water; and
a controller operatively connected to the regulator and the injector to adjust the diverted portion of water and injection rate of the ozone into the portion to attain a target biokill of species in the water when the portion is recombined with the water.

22. The ballast water treatment system of claim 21, further comprising a disperser to disperse injected ozone through the portion prior to recombining the portion with the water.

23. The ballast water treatment system of claim 21, further comprising an ozone generator to provide ozone to the injector.

24. The ballast water treatment system of claim 21, further comprising an ozone generator to provide ozone to the injector, wherein the generator is selected according to a capacity Q determined as sufficient to provide a treatment rate T of injected ozone into the portion to attain a target ozone concentration when the portion is recombined into the water for charging into the ballast tank.

25. The ballast water treatment system of claim 21, comprising a plurality of diverter and injector sets to inject ozone into a plurality of portions of water streams prior to charging each stream into a respective ballast tank of a plurality of ballast tanks.

26. The ballast water treatment system of claim 21, further comprising an ozone generator to provide ozone to the injector, wherein the generator is selected according to an ozone generator capacity $Q_n$ determined according to a summation of a capacity according to a treatment rate T required to treat ballast water of conduits to the plurality of ballast tanks.

27. The ballast water treatment system of claim 21, further comprising a computer usable medium comprising a set of instructions to operate the controller to adjust the diverted portion of water and injection rate of the ozone into the portion to attain the target biokill when the portion is recombined with the water.

28. The system of claim 27, comprising the computer usable medium comprising a set of instructions to operate the controllers to coordinate flow of the diverted portion and injection of ozone to provide a target level of biokill in the water.

29. The system of claim 27, comprising the computer usable medium comprising a set of instructions to operate the controllers to coordinate flow of the diverted portion and injection of ozone to provide a concentration of ozone of 1.0 to 4.5 mg/l in the water.

30. The system of claim 27, comprising the computer usable medium comprising a set of instructions to operate the controllers to coordinate flow of the diverted portion and injection of ozone to provide a concentration of ozone of 1.5 to 4.0 mg/l in the water.

31. The system of claim 27, comprising the computer usable medium comprising a set of instructions to operate the controllers to coordinate flow of the diverted portion and injection of ozone to provide a concentration of ozone of 2.0 to 3.0 mg/l in the water.

32. The system of claim 27, comprising the computer usable medium comprising a set of instructions to operate the controllers to coordinate flow of the diverted portion and injection of ozone to provide a 95% or greater species biokill in the water.

33. A method of ozone treatment, comprising:
determining a target biokill of species for ballast water unloading from a sea faring vessel to the sea;
regulating a diverted portion of the ballast water prior to unloading;
adjusting the regulating of the diverted portion of water and a rate of injection of ozone into the portion to attain the target biokill; and
injecting ozone at the determined rate into the regulated diverted portion to attain the target biokill when the portion is recombined into the water for unloading the ozone injected water to the sea.

34. A ballast-water treatment system comprising:
a sea faring vessel including at least one ballast tank;
an ozone generator that generates ozone,
a ballast water conduit that discharges water from the ballast tank and conducts the water to an unloading port of the sea faring vessel;
a regulator to divert a portion of the water from the conduit;
an injector to provide an ozone injection rate into the portion of water; and
a controller operatively connected to the regulator and the injector to adjust the diverted portion of water and injection rate of the ozone into the portion to attain the target biokill when the portion is recombined with the water in the conduit.

35. A method of ozone treatment, comprising:
uploading sea water to a ballast tank of a sea faring vessel;
regulating a diverted portion of the uploading water prior to charging the water into the ballast tank;
adjusting the regulating of the diverted portion of water and a rate of injection of ozone into the portion to attain a target biokill of species within the water; and
injecting ozone at the determined rate into the regulated diverted portion to attain the target biokill of species within the water when the portion is recombined into the uploading water for charging to the ballast tank.

36. The method of claim 35, comprising
adjusting flow of the diverted portion and injection of ozone to provide a 95% or greater species biokill in the water.

* * * * *